June 13, 1950 W. S. MARTIN 2,511,281
APPARATUS FOR CONVERTING MATERIAL
Filed May 3, 1945 4 Sheets-Sheet 1

INVENTOR.
WARREN S. MARTIN
BY Louis L. Ansart
his Attorney

June 13, 1950 W. S. MARTIN 2,511,281
APPARATUS FOR CONVERTING MATERIAL
Filed May 3, 1945 4 Sheets-Sheet 2

INVENTOR.
WARREN S. MARTIN

June 13, 1950  W. S. MARTIN  2,511,281
APPARATUS FOR CONVERTING MATERIAL
Filed May 3, 1945  4 Sheets-Sheet 3

INVENTOR.
WARREN S. MARTIN
BY Louis L. Ansart
his Attorney

June 13, 1950 W. S. MARTIN 2,511,281
APPARATUS FOR CONVERTING MATERIAL
Filed May 3, 1945 4 Sheets-Sheet 4

INVENTOR.
WARREN S. MARTIN

Patented June 13, 1950

2,511,281

UNITED STATES PATENT OFFICE 2,511,281

APPARATUS FOR CONVERTING MATERIAL

Warren S. Martin, Massapequa, N. Y.

Application May 3, 1945, Serial No. 591,824

15 Claims. (Cl. 263—26)

The present invention relates to apparatus for converting material.

Large quantities of lime are used in certain processes and the original lime CaO, after producing the desired results, is changed to $CaCO_3$ and is precipitated in very finely divided or powdered form. In order to eliminate the necessity for continually obtaining fresh supplies of limestone ($CaCO_3$) and converting this material into lime (CaO), it becomes important to take the precipitated $CaCO_3$, which contains a high moisture content and convert it into lime (CaO) which can be used again in the original process. Some of the calcium carbonate is lost each time it is used, but the net result is to minimize the requirement for additional fresh lime.

One process of this general character is the lime-soda process of water softening in which soda ash ($Na_2CO_3$) is introduced to reduce the sulphates of calcium, if present, to produce $CaCO_3$ and $Na_2SO_4$. Slaked lime, $Ca(OH)_2$, mixed with water to form a "milk" is also introduced to convert calcium bicarbonate ($Ca(HCO_3)_2$), to calcium carbonate. All of the calcium is thus precipitated as carbonate. The resulting sodium sulphate remains in solution and is not injurious.

Originally the lime was obtained by calcining broken-up limestone which was comparatively easy to handle. If obtained as a byproduct of the process mentioned, the calcium carbonate not only has a high moisture content but is in finely divided form and is difficult to handle particularly when dry.

Precipitated calcium carbonate with a high moisture content is also a usual residue in connection with the preparation of paper pulp, the refining of sugar, and other processes. The calcium carbonate having such a high moisture content may be referred to as sludge or "mud." If the moisture content of the available sludge exceeds fifty per cent, it is usually better and more economical to dewater it in advance, by mechanical means, such as a centrifuge or a vacuum filter, to bring the moisture content down to a value between thirty-five and forty per cent.

The finely divided material with high moisture content is first dried and then subjected to high temperatures to reconvert the material. The hot gases resulting from said high temperature treatment are used to effect the preliminary drying which may be done so as to utilize as large an amount as possible of the heat in said hot gases. The process should also be carried out in such a way as to avoid any substantial loss of material by being carried away in the heated gases flowing to the flue. The dryer may be in the nature of a multiple hearth device in which the material is passed from hearth to hearth on each of which the material may be rabbled in generally a radial direction from the supply means to the discharge.

An important object of the invention is to provide a novel and advantageous apparatus adapted to carry out said process.

Another object of the invention is to provide apparatus adapted to carry out a novel process for drying the moisture-containing precipitate and then treating the material at a high temperature to convert it into another material accompanied by the generation of gas which is used for the preliminary drying of additional material, without appreciable loss of the powdered material.

Another object of the invention is to provide apparatus for converting material wherein the rates of feed may be varied to a considerable degree without operating below a reasonably high efficiency.

Another object is to provide apparatus adapted to carry out a process of the general character specified wherein the gases from a high temperature stage are utilized to raise the temperature of the moist material during drying and eventually to substantially the initial temperature of the high temperature stage.

Another object of the invention is to provide a calcining hearth furnace of such characteristics that operations can be carried on at temperatures several hundred degrees higher than is possible in a usual calcining hearth furnace constructed of usual fire brick.

Another object of the invention is to provide an apparatus of the character described wherein the method of the present invention can be carried out by utilizing the greater part of the heat carried by the gases leaving the high temperature part of the apparatus to attain readily a high overall efficiency while using standard materials and usual thickness of insulation in the furnace. Said overall efficiency may be as high as seventy-five per cent.

Another object of the invention is to provide apparatus of the character specified having in the annular space between the inner surface of a circular opening in a hearth and a rotating shaft passing therethrough, a novel and advantageous annular rotary feeder or valve operable by the rotary shaft to feed material downwardly therethrough while maintaining a gas seal at that location.

Another object of the invention is to provide apparatus of the general character specified having at the annular space between the inner surface of a circular opening in a hearth and a rotating shaft passing therethrough, a novel and advantageous annular rotary feeder or valve maintaining a gas at that location and operable by the rotary shaft to feed material downwardly therethrough in a stream from one side of the shaft and traveling with said shaft along said annular space.

Another object of the invention is to provide apparatus of the general character specified at the annular space between the inner surface of a circular opening in a hearth and a rotary shaft passing therethrough, a novel and advantageous annular rotary feeder or valve maintaining a gas seal at that location and operable by the rotary shaft to feed material downwardly in a stream which travels with said shaft along an annular space, means traveling with said shaft and guiding the downwardly fed material through and separating it from the gases entering said unit from below.

Another object of the invention is to provide apparatus of the general character specified having in the annular space between the inner surface of a circular opening in a hearth and a rotating shaft passing therethrough, a novel and advantageous annular feeder maintaining a gas seal at that location and operable by said shaft to feed material upwardly through said annular opening and deposit it on said hearth in a circle around the shaft.

Another object of the invention is to provide apparatus of the general character specified having a high temperature unit into which dry finely divided material is introduced substantially at hearth level and after being rabbled across the hearth is discharged into a flow of cool material of the same kind to provide a mixture at a lower temperature which is easier to handle and less destructive of apparatus.

Another object of the invention is to provide apparatus of the general character specified wherein the fine dried material is supplied to the hearth and removed therefrom without passage of a current of gases therethrough.

Another object of the invention is to provide apparatus of the general character specified wherein dry finely divided material may be deposited at hearth level in a compartment of which the hearth is the floor, moved in generally radial directions to an outlet to avoid the picking up of the material by gas currents and fuel may be burned in a fuel burning part of said compartment above a heat resisting muffle having a central opening extending across said compartment and the resulting gases may be discharged from an outlet in the side of the unit above the level of the material bed on the hearth.

Another object of the invention is to provide apparatus of the general character specified wherein dry finely divided material may be introduced substantially at hearth level to said hearth and rabbled thereover to outlet means at substantially hearth level, the upper part of the peripheral wall being formed as a conical arch supporting burners directed to provide a whirling motion whereby thorough heating of the material bed will be effected before the gases are discharged through outlet means above the material bed level.

In carrying out the invention, wet cake is fed into a drier and preheater unit constructed along the general lines of a known multiple hearth furnace but differing therefrom in different respects including the provision of means to prevent counterflow of gases against the flow of material from one hearth to another in the part of the furnace treating the material after it has become dry. Hot dehydrated material is discharged from the drier and passed to storage means from which the high temperature or calcining hearth or hearths are supplied.

With usual operation, the dried material will pass from the drier to a surge bin and therefrom to a high temperature or calcining hearth. Preferably, a special device is provided to deliver the material to the central part of this hearth where it is distributed in an annular path to provide full and uniform flow of material over the hearth from said central portion to the periphery. In order to retain the material on one hearth for a period of time sufficient to obtain full treatment, the rabbling equipment may be arranged for some back-rabbling.

The treatment for producing lime is rendered most effective by the frequent movement of the material while subjected to heat. Limestone calcines very readily at a temperature of 2000° F. but since this material is of high heat-insulating nature and the lime tends to be cooled by its chemical absorption of heat, it is necessary to provide a source for heating well above 2000° F., whereby by radiation and convection the material bed will be maintained at 2000° F. A temperature of from 2300° F. to 2400° F. will be required to provide efficient operation. The apparatus and process may be modified in various details.

Other objects, features and advantages will appear upon consideration of the following detailed description and of the drawings in which Fig. 1 is a diagrammatic view of one form of the apparatus comprising a drier and furnace in sectional elevation;

Figure 1:
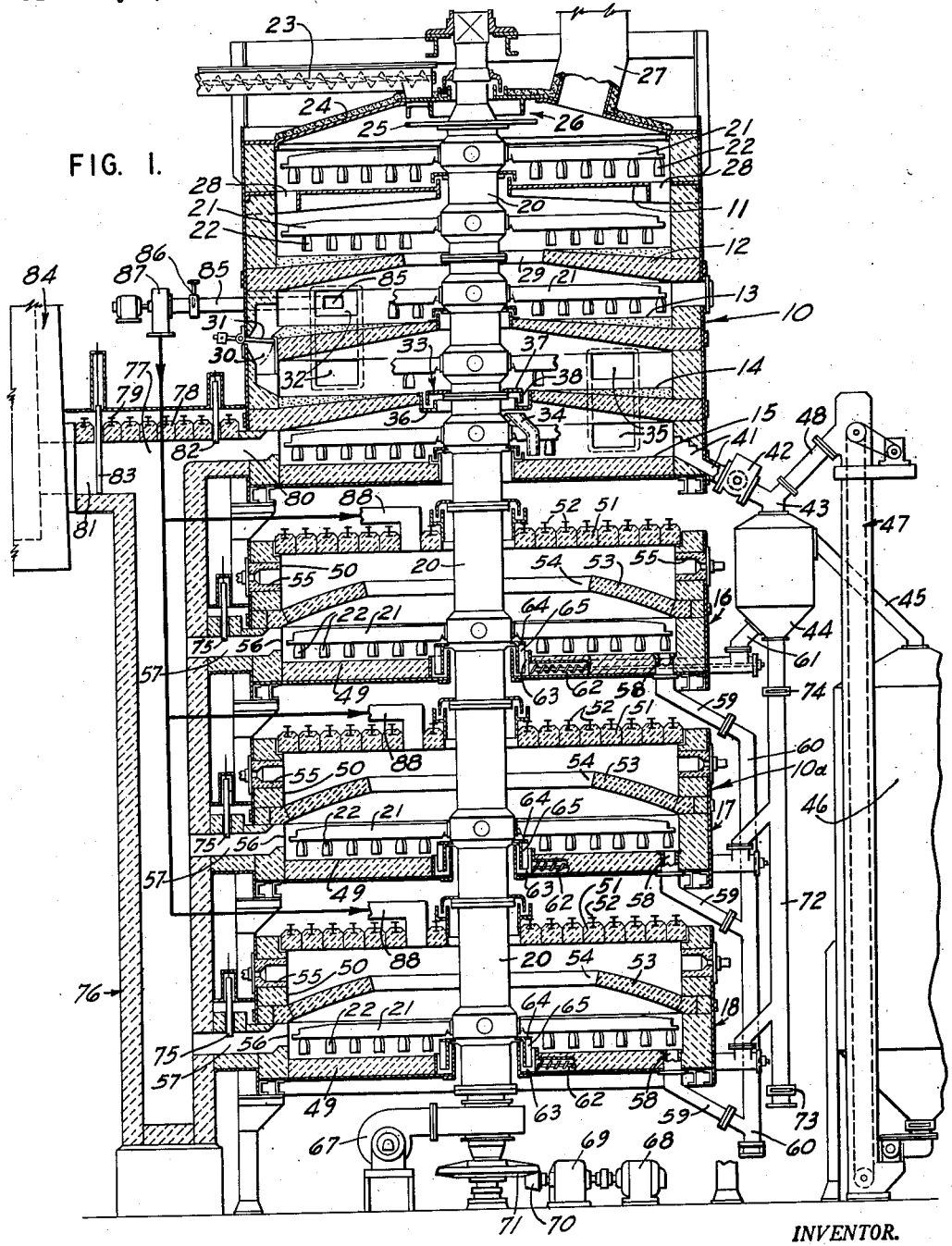
Figure 2:
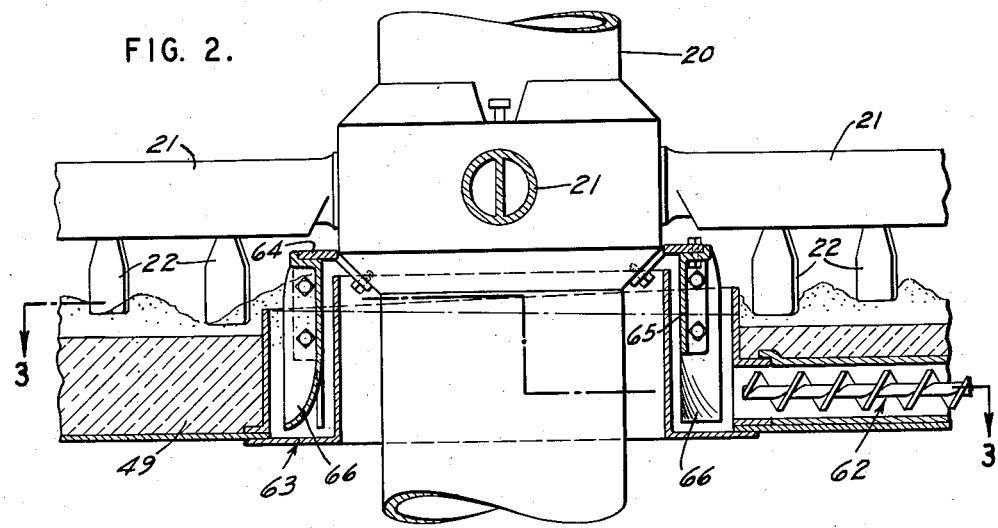
Fig. 2 is a sectional elevation of the central feeder of a high temperature hearth of Fig. 1.
Figure 3:
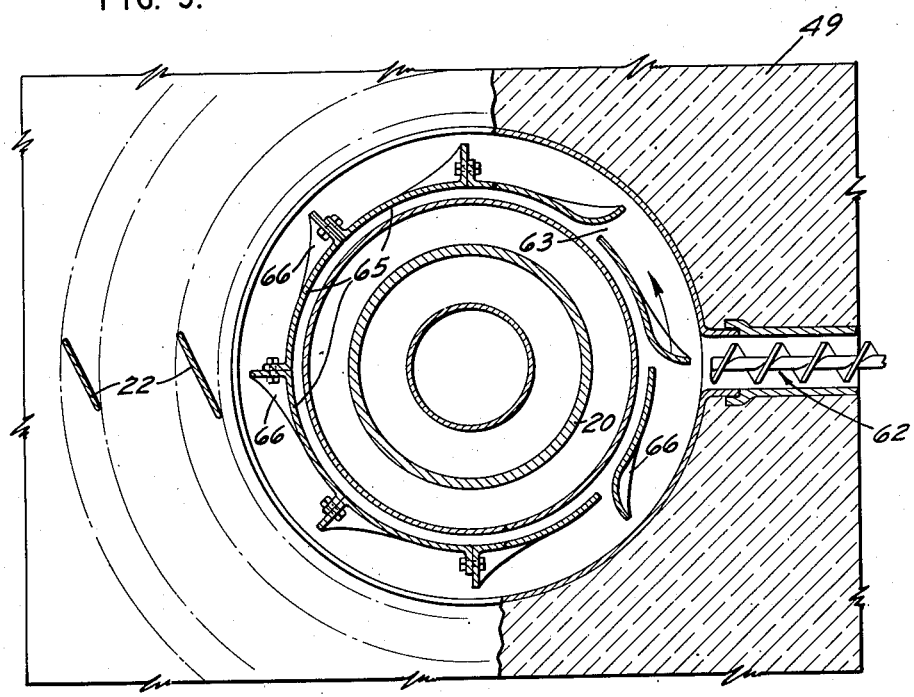
Fig. 3 is a section taken along the line 3—3 of Fig. 2.

Referring to the drawings, the apparatus comprises a part 10 acting as a drier or drier and preheater, and a part 10a constituting a calcining furnace. Preferably the part 10 is superimposed centrally above the part 10a but this is not essential. The part 10 may be in the form of a multiple hearth furnace having from top to bottom five hearths, 11, 12, 13, 14 and 15, and the high-temperature or calcining part 10a may comprise from top to bottom three calcining units 16, 17 and 18 having individual hearths at the bottoms thereof.

On certain hearths the material is supplied centrally and rabbled outwardly to discharge means at the periphery, and on other hearths the material is supplied at the periphery and rabbled inwardly to central discharge means. The rabbling of material on all hearths is effected by means of a central air-cooled shaft 20, arms 21 projecting from the shaft over the various hearths and blades 22 projecting downwardly from the arms and inclined in the proper direction to effect inward or outward feed on the corresponding hearths. Said shaft 20 and arms 21 may be substantially the same as corresponding parts in my Patent No. 2,332,387, October 19, 1943.

Material, such as calcium carbonate, in the form of wet cake is advanced, as by means of a screw conveyor 23, and dropped through the top or cover 24 upon a disk 25 carried by the central or center shaft 20 and constituting part of a distributor 26 such as disclosed and claimed in my Patent No. 2,361,557 October 31, 1944. In this unit 10 the heating of the material passed downwardly from hearth to hearth is effected principally by passing hot gases of combustion from the furnace 10a through the compartment over the hearths from the bottom to the top compartment. From the uppermost or top compartment, that over the hearth 11, the gases at much reduced temperatures are discharged through an outlet in the cover 24 into a discharge flue or duct 27. Above the compartments where most of the drying is effected, the material passes through a hearth either at a central drop hole or at one or more peripheral drop holes, either arrangement which comes first being followed by the other. As illustrated the uppermost hearth 11 has peripheral drop holes 28 and the next hearth has a central discharge or drop opening 29.

In the compartments above hearths 11, 12 and 13, the wet cake is dried and the gases pass from a lower compartment to a higher one countercurrently to the material and through the same openings. After the material has thus been dried above said hearths 11, 12 and 13, the upward flow of gases through a hearth must be separated from the downward flow of material in the to avoid removal of the fine dry material in the gas currents. To this end, the dried material on the hearth 13 is passed through one or more ducts 30 around the edge of said hearth 13 and through a valve 31 to the hearths 14. The material valve 31 which is here disclosed (Fig. 1) as a counterweighted gate, serves to prevent counterflow of hot gases along the same path and cause the gases to pass the hearth 13 through a duct 32.

The material falling on the hearth 14 at its periphery is rabbled to the central portion thereof where it passes through a valve 33 into the upper end of a closed chute 34 carried by the center shaft 20 and depositing the material on the hearth 15 in an annular area. The valve 33 prevents upward passage of gases therethrough and causes them to pass the hearth 14 through a duct 35.

The valve 33 comprises an upwardly facing annular channel 36 fixed in the central opening of hearth 14 and coaxial with shaft 20, and a plate 37 of generally annular form fixed on the shaft 20 and having an eccentric circular flange 38 extending downwardly into the channel 36 but spaced from the bottom of the channel. It should be noted that the inner wall of channel 38 is much lower than the outer wall and that material in the channel would be discharged much more readily over the inner wall. The material on the hearth 14 is rabbled into the channel where it would normally be higher than the lower edge of the flange 38 and would maintain a gas seal.

Figure 4:
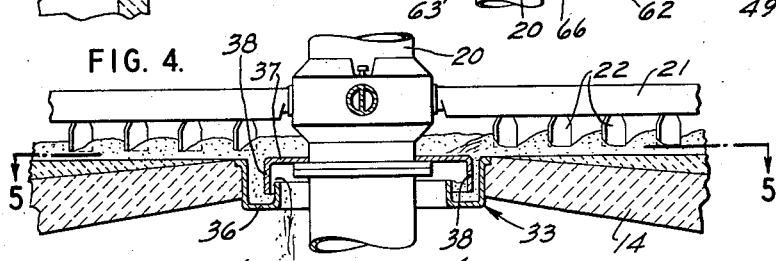
Fig. 4 is a sectional elevation of the central zoning valve in the hearth above the lowermost compartment of the drier.
Figure 5:
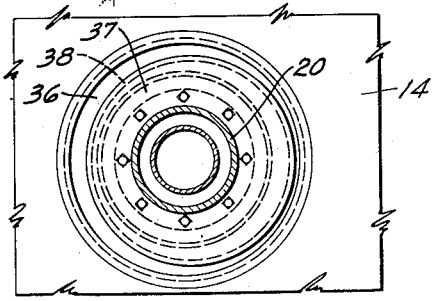
Fig. 5 is a section taken along the line 5—5 of Fig. 4.

As best seen in Figs. 4 and 5, the finely-divided material tends to accumulate and pile up around the shaft 20 and in addition to keeping the channel 36 full at the outside of flange 38, tends to work inwardly beneath the lower edge of flange 36. At the right of Figs. 4 and 5, the flange 38 is nearest to the outer wall of channel 36 and farthest from the inner wall of the channel 36, the reverse being true at the left of the shaft 29.

Figure 6:
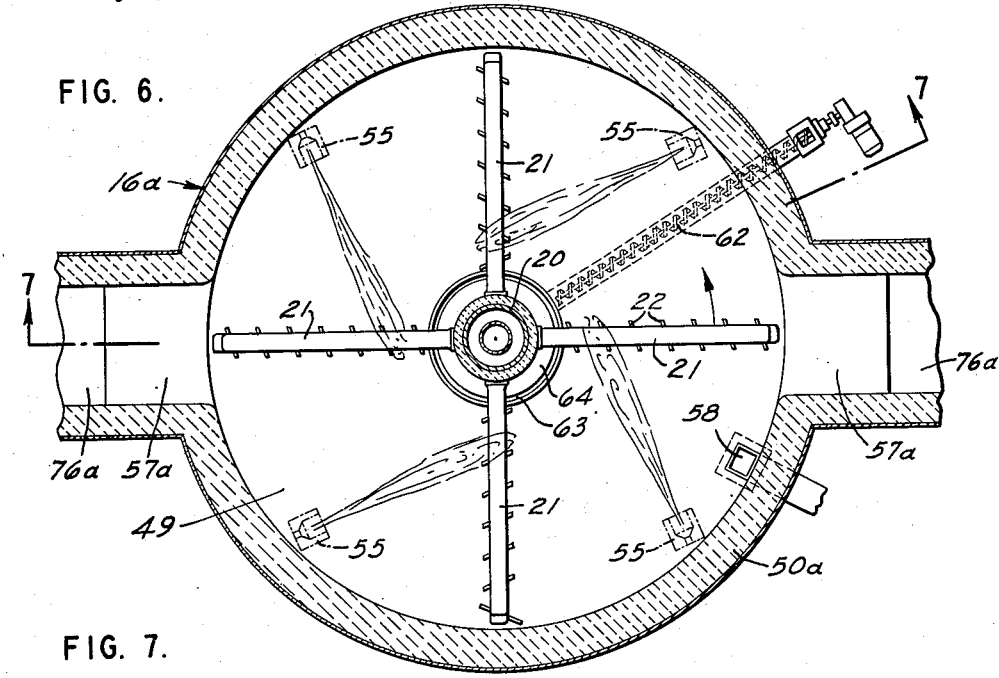
Fig. 6 is a sectional plan view, taken along the line 6—6 of Fig. 7, of a modified form of a high temperature unit.

As the shaft rotates in the direction indicated in Fig. 6 the space in the channel outside flange 38 (Fig. 4) will gradually get wider until the shaft has turned through 180°, and the space at the inner side of flange 38 will decrease, thus permitting more material to enter the channel outside flange 38 and to force material over the inner wall of the channel. This flow over the inner wall is relatively slow and generally is localized at the part of the inner wall of the channel adjacent the outermost point of the eccentric flange. This point travels around the channel and the discharge stream travels around the inner wall of the channel.

This valve is capable of operating to deposit the material in a circle on hearth 15 so as to assure uniform distribution over the whole hearth, but the fine material as it drops would pass through a gas stream and some of it might be carried away in the gas current and lost. To guard against such losses, use may be made of a duct or spout 34 (Fig. 1) carried by the shaft 20 and delivering the material close to the upper surface of hearth 15, thereby avoiding loss of material in the gas flow.

In the compartments above hearths 14 and 15 it is intended to use high temperatures to preheat the material directly before advancing the same and to burn out on the lower hearth any combustible impurities present in the calcium carbonate at that time. Fire brick hearths are likely to be damaged by the application of high temperature heat thereto at both sides. However, in the instant apparatus, the lowermost hearth is supported by steel and is subjected to heat on one side only. Consequently the temperature over the lowermost hearth may even be made high enough to produce some calcination.

The hot dry product, in this case calcium carbonate, may be discharged from the periphery of the hearth 15 through a downwardly inclined closed chute 41 to suitable storage means and feeding means for supplying it to the calcining furnace 10a. Material such as lime cake after passing the drying or the drying and preheating stage will usually disintegrate into a fine powder but there may be a small percentage remaining in chunks or lumps. In order to assure a uniform size of material, a grinder or pulverizer 42 is provided in duct 43 leading from chute 41 to a surge bin 44 sufficient to accommodate normal fluctuations.

However, to accommodate drying and calcining at separate periods of operation, provision is made for material overflowing from the surge bin to pass through a duct 45 into a large storage bin 46. Return of material from the bin 46 to surge bin 44 when required may be effected by means which may include a bucket elevator 47 receiving material from the bottom of bin 46 and delivering it into the upper end of a duct 48 through which it flows into the top of the surge bin 44. Obviously grinder 42 when full of material may also serve as a gas seal.

The process of producing lime is greatly affected by frequent movements thereof while subjected to heating at high temperatures. Limestone or calcium carbonate calcines readily at 2000° F., but since this material is of high heat insulating character and there is a tendency of the lime to cool by its chemical absorption of heat it is necessary to maintain the temperature within a range higher than the desired material bed temperature.

The elements of temperature and time are essential factors in producing calcination. In the present instance it is desired to complete the calcination in approximately one hour which would require that a material bed of one inch in depth be maintained at 2000° F. for that period. To maintain this rate of calcination, a temperature differential of from 300° to 400° F. will be necessary to supply sufficient heat by radiation and convection to the material bed. A temperature of from 2300° to 2400° F. would therefore be required.

To withstand such temperatures, provision has been made of a calcining furnace 10a comprising one or more units. As illustrated in Fig. 1 there are three of these units 16, 17 and 18 from top to bottom, each having a flat circular hearth 49 supported on steel, a vertical peripheral or side wall 50, and a flat roof arch 51 supported by steel beams 52. Each unit also includes a muffle arch or muffle 53 with a large central opening 54, located between the calcining bed on the hearth 49 and the heat source which may be in the form of burners in burner tiles 55. Suitable fuel such as fuel oil or gases may be used in said burners, and the burners may be inclined at such angles to the corresponding radii that jets of burning fuel projecting from said burners will not extend over the central opening 54 and their nearest approach will be along paths substantially tangential to the opening.

Said muffle 53 by providing a chamber above the same tends to effect more complete combustion of the fuel and to cause a more positive flow of combustion gases by directing them downwardly and outwardly along the material bed toward the periphery of the hearth and to an opening 56 in the side wall constituting the entrance to a generally horizontal outlet flue 57.

Inasmuch as muffle 53 is subjected to heat on both sides or faces and at very high temperatures, this muffle must be constructed of material of high heat-resistance. Such heat-resistant material may be carborundum which has another important advantage in that it has high thermal conductivity and a great amount of heat applied to the upper face of the carborundum muffle will be conducted to the lower face and thus transmitted to the material bed therebelow.

The material thus treated at about 2000° F. will be discharged from this unit of the calcining furnace at substantially that temperature, and it is advantageous to provide for discharging this material from an outlet 58 near the periphery which leads into a downwardly and outwardly inclined duct 59 leading into a vertical duct 60. Obviously the arrangement of the duct 59 leading into the duct would enable these parts to be constructed to advantage of materials of high heat resistance.

Such peripheral discharge makes it necessary to have a center feed with uniform distribution. An advantageous form of such center feed is illustrated in Figs. 1, 2, 3 and 7. Hot material such as calcium carbonate may be supplied directly from the drier 10 or indirectly through surge bin 44 and a duct 61 to a feeding device such as a screw conveyer 62 at the bottom of hearth 16 and supplying the material to a circular or annular trough 63 at the center of the hearth in the central opening accommodating the center shaft 20. Just above the trough 63, the center shaft has a flange or ring 64 extending across the trough and carrying a ring or plow or blade members 65 extending downwardly into the supply trough.

The upper portions of the plows 65 are joined together in a continuous ring (see left part of Fig. 3) substantially coaxial with the inner wall of the trough and while the trough contains sufficient material there is provided a seal against leakage of air along the center shaft 20. Each plow member 65 has an outwardly extending member or fin 66 to advance the material around the supply trough from the point of supply at the discharge end of the conveyer. Said fins will force the material to heap high around the upper portions of the blades and the top of the material heap will then flow over the top edge of the outer wall of the supply trough onto the hearth.

Since the material enters the trough at one point, the outer wall of the trough may be of maximum height at that point and have a gradual decrease in height around its periphery in one direction with of course a return to the maximum height as the starting point is approached. As a result there will be a gradual spillage of material around the periphery of the trough and a substantially uniform distribution of the material around the central part of the hearth preparatory to rabbling the material to the periphery of the hearth and the outlet 58.

The upper portion of each plow fin 66 acts to advance the material along the trough and the lower portion has a light curvature serving to plow the material outwardly and to lower the level of material effecting the gas seal, thus avoiding possible spillage of material through the seal.

Rabbling means such as commonly used with multiple hearth furnaces and substantially the same as disclosed herein, constitute suitable means for stirring the material and conveying it across a hearth. In order to effect suitable stirring and maintain sufficient detention in one hearth, it is also desirable to furnish some of the rabble arms with reverse angle blades producing back rabbling. The innermost blades may be of such length as to advance the material away from the discharge or outer edge of the supply trough 66. The center shaft 20 may require some refractory insulation on the exterior to resist the heat encountered. As indicated in Fig. 1 the air-cooling of the center shaft may be effected by means of air forced through the shaft by means of a fan 67. The rabble arms 21 may also be cooled by air supplied thereto from the shaft 20. The shaft 20 may be rotated by means of a motor 68, a speed reducer 69 and bevel gears 70 and 71.

The material supply duct 61 for the calcining unit 16 is supplied directly from the surge bin 44. For additional units 17 and 18 the supply ducts 61 receive material from a duct 72 extending downwardly from the bottom of the surge bin 44 and having at its lower end a gate 73 which is normally closed. Duct 72 is also provided near its upper end with a gate 74 which may be closed when calcining unit 16 is the only one to be used.

The combustion gases in the units 16, 17 and 18 pass out through the flues 51, controlled by dampers 75 into a vertical manifold flue 76 of refractory material, having at its upper end a chamber 77 covered by a roof 78 of refractory material suspended from steel beams 79. From the chamber 77 extend two ducts 80 and 81 controlled respectively by dampers 82 and 83. The duct 80 directs the hot gases of combustion into the lowermost compartment of the drier and preheater unit 10 at a level above the layer of material on hearth 15. The duct 81 which is shown as larger than duct 80 leads gases into an upright flue or chimney 84.

In the described operation of calcining $CaCO_3$, $CO_2$ is liberated and together with the $CO_2$ in the gases of combustion which have a high content of $CO_2$, produce in the final gas discharge a substantial $CO_2$ concentration. In furnace operation of this sort, certain advantages are obtained by maintaining in the furnace an atmosphere of reasonably high $CO_2$ content whereby the effective rates of radiation and heat transfer are increased.

Such an increase of the $CO_2$ content of the gases in the furnace may be attained by recirculating gases supplied to the preheating stage of the apparatus, which have spent part of their heat in said preheating stage but have not picked up moisture from the drying stage. As illustrated in Fig. 1 such recirculation may be effected by withdrawing from duct 32 part of the gases passing from the compartment beneath hearth 13 toward the compartment above the same. The gases are withdrawn through a duct 85 having a damper 86, by means of a fan 87, and are passed through branches 88 into the calcining units 16, 17 and 18, through the roofs 51 near the centre shaft 20.

Figure 7:
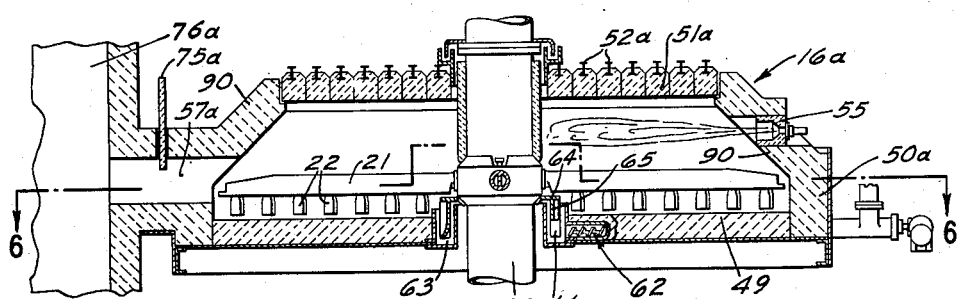
Fig. 7 is a sectional elevation taken along the line 7—7 of Fig. 6.

Figs. 6 and 7 illustrate a type of high temperature unit somewhat similar to those shown in Fig. 1 but with the carborundum muffle 53 omitted and having among other changes a peripheral or side wall 50a with the upper portion in the form of a conical arch 90 extending up to the roof 51a. The burner tiles 55 are in the inclined portion of the arch and thus nearer the center of the furnace. The burner tiles 55 may also be set at such angles (Fig. 6) as to direct the fire along tangents to a cylindrical space around the center shaft 20. In this type of high temperature unit the jets of flame from the burners pass very close to the center shaft 20 and it is desirable to protect the part of the shaft in the unit with heat resistant and heat insulating material (Fig. 7).

Such a setting of several burner tiles will cause a whirling movement of the gases starting at the top center of the high temperature unit and extending outwardly and downwardly to provide proper distributing and ultimate detention of the gases, before exit to flues 57a, two of which are provided instead of one in Fig. 1. It is considered that the use of two flues instead of one will tend to result in improved distribution of gases in this type of unit.

The furnace of the type just described is designed to provide a maximum of radiation from combustion flame and radiation from the side wall and roof, as well as to obtain a good distribution of gases without the muffle. Also the roof over the flat arch is smaller in proportion to the hearth area.

Figure 8:
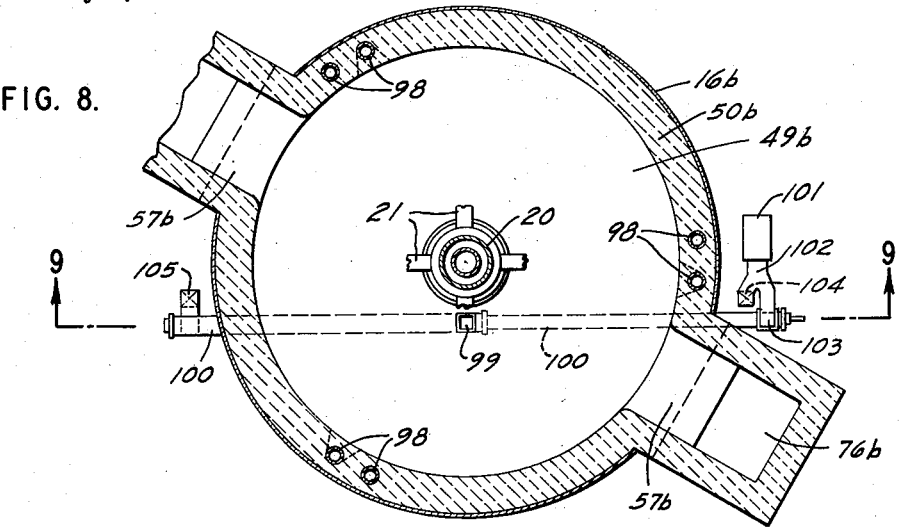
Fig. 8 is a sectional plan view of a third form of the apparatus taken along the line 8—8 of Fig. 9.
Figure 9:
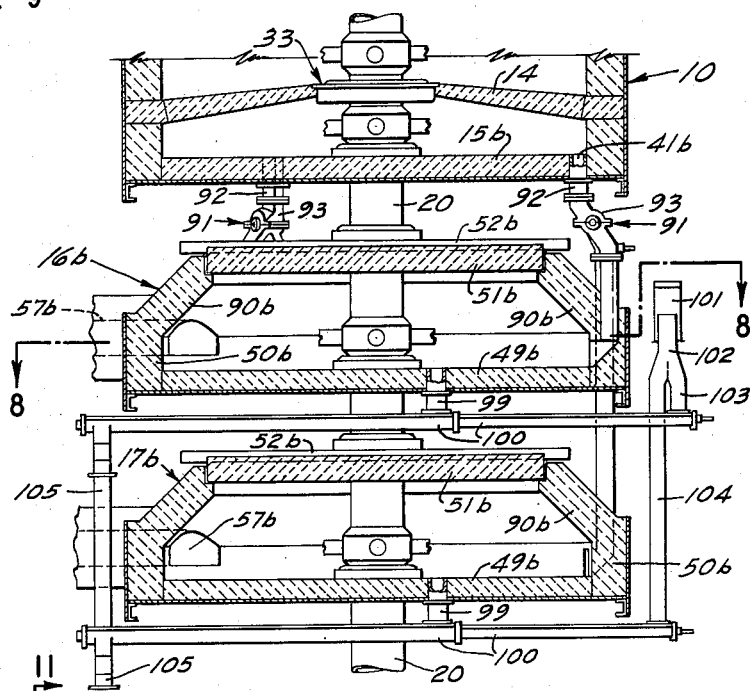
Fig. 9 is a vertical section taken along the line 9—9 of Fig. 8.

Figs. 8 and 9 illustrate modifications of certain parts of the apparatus including the provision of means for feeding the material directly from the lowermost hearth 15b of part 10 of the apparatus, to any of the high temperature units and of means for removing the hot final product from a high temperature hearth and mixing it with cool material of the same general character to provide a mixture of much lower temperature than that of the material as it is discharged from the high temperature hearth, thus rendering the material easier to handle and less destructive of apparatus.

Figure 10:
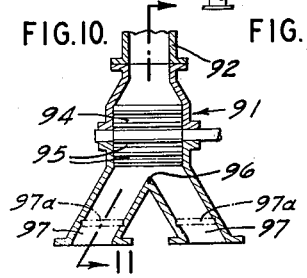
Fig. 10 is a vertical section of a combined gas valve and distributor receiving material from the drying and preheating unit.
Figure 11:
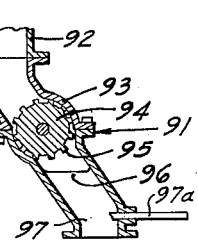
Fig. 11 is a section taken along the line 11—11 of Fig. 10.

In this form of apparatus, material on hearth 15b passes downwardly through openings 41b therein and into devices 91 each serving as a combined valve, feeder and distributor. These drop openings 41b are distributed around the periphery of the hearth and as here indicated are three in number. Each of the devices 91 may be of the form disclosed in Figs. 10 and 11 in which the material from a drop opening 41b passes downwardly through a short duct 92 to a cylindrical chamber in a casing 93 in which is rotated a member 94 of a generally cylindrical form with ribs 95 close to the interior surface of the casing. This arrangement provides a gas seal and would act to break up the loose lumps of material. The material passing out of the casing is separated by a dividing edge 96 into two streams which pass downwardly through two branches 97 with gates 97a into two ducts 98.

One duct 98 of each pair extends downwardly into the vertical part of the peripheral wall of unit 16b and then inwardly and downwardly to the inner surface of this wall to discharge the material therein on the hearth 49b. The second duct of each pair extends downwardly through the side wall of unit 16b to the bottom of the unit and then downwardly into the side wall of the second unit 17b where it inclines inwardly to deposit material therein on the hearth of said second unit.

The material deposited on the hearth 49b of each of units 16b and 17b is well distributed around the periphery thereof and is rabbled inwardly toward the center shaft 20 where it drops through a drop opening and a short duct 99 into an intermediate part of a screw conveyor 100 which is spaced below the hearth and extends completely across the apparatus. As indicated on Fig. 9, cool calcium oxide is discharged from an elevator conveyor 101 into a hopper 102 from which half of the calcium oxide flows by gravity through a duct 103 into the casing of the screw conveyor 100 of the upper unit 16b and the remaining half flows downwardly through a duct 104 into the casing of conveyor 100 of the lower unit 17b. The cool material introduced into the casing of each conveyor 100 is mixed with the hot material dropped through the corresponding hearth and the mixture, at a much lower temperature than the calcined material, flows out the other end of the conveyor casing into a downwardly extending discharge duct 105 which may be provided with a gate at its lower end.

In order to dry and preheat the material such as calcium carbonate cake, expeditiously and thoroughly, it is necessary to pass it over a plurality of hearths heated by hot gases from the calcining part of the apparatus. In drying the cake the gases may be passed upwardly through an outlet through which the material is dropping. When however, the cake is changed into dry powder-like form, passage of the gas countercurrent to the dropping material would carry away an appreciable amount thereof. For this reason the material in passing through the lower hearths is protected from the gas currents which pass upwardly through specially provided ducts. A desirable arrangement for the drier and preheater has three drying hearths and two preheating hearths. Sufficient calcining hearths to handle the output of the drier and preheater should be furnished. Three calcining hearths provide the necessary capacity. However, if the capacity per unit were decreased, it would be necessary to use more, and if the capacity per unit were increased the number of units could be decreased.

It should be understood that changes may be made and that certain features may be used without others, without departing from the true scope and spirit of the invention.

What I claim is:

1. In apparatus of the character described, a multiple hearth drier comprising a plurality of hearths with a center shaft passing therethrough, two adjacent hearths in the upper part having respectively central and peripheral material outlets which also pass gases, and two successive lower hearths above the bottom hearth having material outlets with zoning valves serving also as gas seals, one valve at the periphery of the corresponding hearth and the other at the center of the corresponding hearth; and a high temperature unit receiving material from the drier and supplying to the lowermost compartment of said drier hot gases to pass upwardly through the drier.

2. In apparatus of the class described the combination of a multiple hearth drier comprising a plurality of hearths with outlets for material to pass downwardly and rabbling means including a center shaft for feeding material supplied to the hearths to the outlets for discharge to lower hearths; a high temperature furnace beneath said drier comprising a flat hearth through which said shaft passes with an annular space therebetween, an outlet at the periphery of said hearth, a conveyor feeding dried material from a point beyond the periphery of the high temperature furnace to the center of the hearth beneath the upper surface of the hearth, means for feeding material from the conveyor up between the shaft and hearth and onto the upper surface of the hearth, means including a pulverizer for feeding material from the lowermost hearth of the drier to the conveyor, and means for passing hot gases from the high temperature unit to bottom part of the drier.

3. The combination according to claim 2 wherein there is a plurality of high temperature units and these units are spaced vertically thereby providing for air cooling.

4. The combination of a multiple hearth drier from which the dried material passes through an outlet in the lowermost hearth, a high temperature furnace having two units each comprising a hearth with an outlet in its central portion and an inlet in its peripheral wall, a duct extending downwardly through the peripheral wall of the upper high temperature unit to the corresponding inlet, a second duct extending downwardly through the peripheral wall of the upper unit and that of the lower unit down to said inlet, and a distributor receiving material and dividing it into two streams, which are directed into said downwardly extending ducts, and means for passing hot gases from the high temperature furnace to the drier.

5. In a unit of the character described comprising a flat hearth with a drop hole in the peripheral part thereof, comprising a center shaft passing through the hearth, means to feed dried material beneath the upper surface of said hearth to a location adjacent the center shaft, said hearth being open above said location, means operated by said shaft to feed material at said location upwardly to the top of the hearth, and means for rabbling said material outwardly to said drop hole.

6. In a unit of the character described comprising a hearth, a center shaft extending through the hearth with an annular space therebetween, a conveyor to feed material beneath the hearth surface to a location adjacent to said shaft, and a feeding and elevating device comprising a trough fitting in the opening in said hearth and receiving material from said conveyor, said trough having a high inner wall and a lower outer wall, and means attached to said shaft and extending downwardly into said trough to advance the material along said trough and lift it to spill over said outer wall onto the hearth.

7. In apparatus of the general character described, the combination of a hearth, means for rabbling material to the central part of said hearth including a rabbling shaft extending through the hearth, and means for feeding material on the central part of said hearth downwardly through the annular space between the shaft and the hearth while maintaining a gas seal.

8. The combination according to claim 7 wherein said feeding means comprises a trough with a higher outer wall supported by said hearth in said annular space, and means rotating with the shaft for feeding material supplied by said rabbling means over said inner wall to pass downwardly through said annular opening while maintaining a gas seal.

9. The combination according to claim 7 wherein said feeding means comprises a trough carried by said hearth in said annular opening and a feeding element carried by said shaft and having an eccentric flange extending downwardly into said trough.

10. The combination according to claim 7 wherein said feeding means comprises a member rotating with said shaft and at one portion thereof feeding a stream of material which travels with said portion as the shaft turns.

11. The combination according to claim 7 wherein the material passing downwardly through said annular space is directed beneath said hearth by means including a spout which extends downwardly at a side of said shaft to the lower part of the compartment over the next lower hearth.

12. A unit comprising a hearth, a wall at the periphery thereof, a roof, a muffler between said hearth and said roof and having a central opening, at least one burner in said peripheral wall above said muffler and pointing in a direction to produce a jet of burning fuel substantially tangent to said central opening, a center shaft passing through said central opening and leaving an annular opening, an inlet in said roof through which are introduced gases and vapors to be burned, rabbling means projecting from said shaft over said hearth, means for introducing material to said hearth through a gas seal device between the same and said shaft, gas-seal material-outlet means at the periphery of said hearth, and a peripherally located gas outlet below said baffle.

13. A unit comprising a hearth, a chamber thereover, a center shaft entering said chamber through gas seal means, rabbling means projecting from said shaft to rabble material over said hearth between center and periphery, gas-seal material-introducing means at said periphery, gas-seal material outlet means adjacent the gas seal of said shaft, at least one burner in the upper part of said unit imparting a whirling movement to the gases, a peripherally located combustion gas outlet, and a conveyor extending across said hearth at the lower side thereof beneath said material outlet means, said conveyor containing cooler material into which the hot material drops through said material outlet.

14. In a unit of the character described comprising a hearth, a center shaft extending through the hearth with an annular space therebetween, a conveyor to feed material beneath the hearth surface to a location adjacent to said shaft, and a feeding and elevating device comprising a trough fitting in the opening in said hearth and receiving material from said conveyor, said trough comprising a high inner wall and a lower outer wall, having a high point adjacent to the point where the conveyor supplies material to the trough and gradually decreases in height around its periphery until it again approaches the high point where its extreme height is restored, and means attached to said shaft and extending downwardly into said trough to advance the material along said trough and lift it to spill over said outer wall onto the hearth.

15. In a unit of the character described comprising a hearth, a center shaft extending through the hearth and an annular space therebetween, a conveyor to feed material beneath the hearth surface to a location adjacent to said shaft, and a feeding and elevating device comprising a trough fitting in the opening in said hearth and receiving material from said conveyor, said trough comprising a high inner wall and a lower outer wall, and a part attached to said shaft and projecting downwardly into said trough, said part comprising a cylindrical flange close to the inner wall of the trough and vanes formed at their upper parts to force material along the trough and curved at their lower parts to move material away from the inner wall of said trough and upwardly over the outer wall of the trough.

WARREN S. MARTIN.

REFERENCES CITED

The following references are of record in the file of this patent:

UNITED STATES PATENTS

| Number | Name | Date |
| --- | --- | --- |
| 1,114,371 | Laist | Oct. 20, 1914 |
| 1,184,913 | Auger | May 30, 1916 |
| 1,196,049 | Von Rauschenplat | Aug. 29, 1916 |
| 1,703,130 | Wightman | Feb. 26, 1929 |
| 1,862,869 | Tainton | June 14, 1932 |
| 1,960,413 | Horn | May 29, 1934 |
| 2,089,306 | Stimmel et al. | Aug. 10, 1937 |
| 2,113,522 | Walker | Apr. 5, 1938 |
| 2,171,507 | Newhouse | Aug. 29, 1939 |
| 2,225,199 | Abbott | Dec. 17, 1940 |
| 2,232,834 | Ahlmann | Feb. 25, 1941 |
| 2,238,792 | Hanawalt et al. | Apr. 15, 1941 |